(12) United States Patent
Bell et al.

(10) Patent No.: US 6,794,772 B1
(45) Date of Patent: Sep. 21, 2004

(54) ROTARY MOTOR USING ELECTRICAL LINEAR ACTUATORS

(75) Inventors: Dale K. Bell, Ortonville, MI (US);
Dennis A. Kramer, Troy, MI (US);
Clive Harrup, Bromham (GB);
Mehmet S. Ciray, Glenwood, IN (US);
Silvio M. Yamada, Gahanna, OH (US);
Dean M. House, Pataskala, OH (US);
David K. Platner, Shelby, MI (US);
Dale J. Eschenburg, Clinton Township, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/413,782

(22) Filed: Apr. 15, 2003

(51) Int. Cl.$^7$ ................................................. H02K 7/06
(52) U.S. Cl. ........................................ 310/20; 74/89.34
(58) Field of Search ...................... 74/89, 89.29, 89.34, 74/88, 88.29, 8, 9.34; 310/20, 80, 83

(56) References Cited

U.S. PATENT DOCUMENTS

| | | | | |
|---|---|---|---|---|
| 2,682,004 A | * | 6/1954 | Schulenburg | 310/23 |
| 5,053,685 A | * | 10/1991 | Bacchi | 318/135 |
| 5,341,056 A | * | 8/1994 | Maccabee | 310/26 |
| 5,602,434 A | * | 2/1997 | Riedl | 310/26 |
| 5,703,553 A | * | 12/1997 | Bushko et al. | 335/215 |

* cited by examiner

Primary Examiner—Thanh Lam
Assistant Examiner—Judson H. Jones
(74) Attorney, Agent, or Firm—Carlson, Gaskey & Olds

(57) ABSTRACT

An electric motor assembly is provided that includes a housing. A rotor is arranged in the housing and is rotatable about an axis. A vehicle wheel is coupled to the rotor. The rotor has an annular profile defining sinusoidal teeth and is generally concentric with the axis. The angle and number of oblique surfaces of the teeth and the diameter of the rotor, in part, define the speed and torque of the rotor. A plurality of electric linear actuators are arranged circumferentially about and generally parallel to the axis. The actuator includes shafts having ends that engage the profile. The shafts are movable between extended and retracted positions to rotate the rotor in a desired direction. A sensor detecting the position of the rotor and a controller may be used to effect the desired rotation.

20 Claims, 2 Drawing Sheets

ROTARY MOTOR USING ELECTRICAL LINEAR ACTUATORS

BACKGROUND OF THE INVENTION

This invention relates to a rotary motor, and more particularly, the invention relates to a motor that utilizes linear actuators to effect low speed, high torque rotation.

Vehicles typically use internal combustion engines for their sole propulsion means. There has been increasing pressure to use alternative propulsion systems or supplemental propulsion systems to the traditional combustion system to reduce vehicle emissions. To this end, electric motors have been used as a supplemental or substitute system to the combustion engine.

Electric motors used in vehicle applications typically include a rotor and stator arrangement that results in a high motor output shaft speed. Motors using a rotor and stator arrangement characteristically cannot produce high torque at low speeds without stalling. Accordingly, gear reduction boxes are coupled between the motor and vehicle wheel end to reduce the speed and increase the torque to the wheel. However, the gear reduction boxes add expense to the vehicle, in particular for vehicles that primarily require high torque at low speeds. Therefore, what is needed is an electric motor that produces high torque at low speeds without requiring a gear reduction box.

SUMMARY OF THE INVENTION AND ADVANTAGES

The present invention provides an electric motor assembly that includes a housing. A rotor is arranged in the housing and is rotatable about an axis. A vehicle wheel is coupled to the rotor. The rotor has an annular profile defining sinusoidal teeth and is generally concentric with the axis. The angle and number of oblique surfaces of the teeth and the diameter of the rotor, in part, define the sped and torque of the rotor. A plurality of electric linear actuators are arranged circumferentially about and generally parallel to the axis. The actuator includes shafts having ends that engage the profile. The shafts are movable between extended and retracted positions to rotate the rotor in a desired direction. A sensor detecting the position of the rotor and a controller may be used to effect the desired rotation.

Accordingly, the above invention provides an electric motor that produces high torque at low speeds without requiring a gear reduction box.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1A:
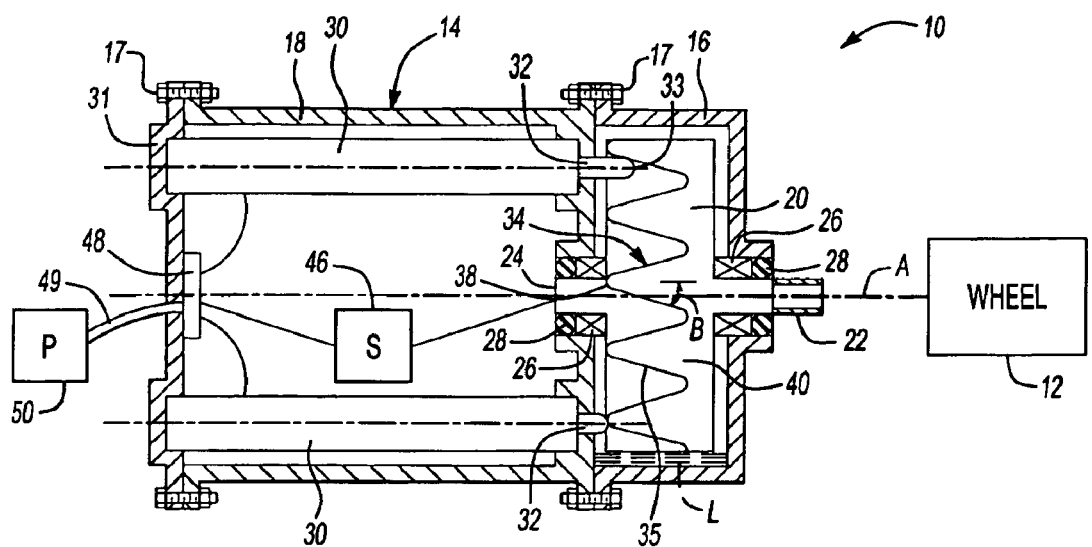
FIG. 1A is a cross-sectional view of the present invention rotary electric motor.

A motor 10 of the present invention is shown in FIG. 1A. The motor 10 may be used to rotationally drive the vehicle wheel 12. The motor 10 includes a housing 14 that may include first and second housing portions 16, 18, respectively, secured together by fasteners. A rotor 20 may be arranged in the first housing portion 16 and substantially enclosed therein so that the rotor 20 may be exposed to lubricant L within the housing portion 16. The rotor 20 is rotatable about an axis A and includes opposing shaft ends 22, 24, which are supported in the housing 14 by bearings 26. Seal 28 may be used between the ends 22, 24 and housing 14 to retain the lubricant L within the housing portion 16. One of the ends 22 may include splines to better secure the vehicle wheel 12 or other drive portion to the rotor 20.

A plurality of electric linear actuators 30 are arranged circumferentially about and generally parallel to the axis A. The actuators 30 may be located in the second housing portion 18 between the housing portion 18 and a rear cover 31, which is secured to the housing portion 18 by fasteners 17. The actuators 30 have shafts 32 that move linearly between extended and retracted positions in response to an applied voltage. The shafts 32 extend into the first housing portion 16 and include ends 33 that engage an annular profile 34 on the rotor 20. The actuator spacing and the profile 34 are designed to ensure that the shafts 32 engage different locations on the profile 34, as will be appreciated from the discussion below.

The profile 34 preferably defines sinusoidal teeth 38 having surfaces 35 that are oblique relative to the axis A. The curvature of the profile 34 ensures smooth, uniform rotation in response to the linear actuators 30. A desired rotor speed and torque may be achieved by providing a particular number of teeth 38, a particular angle B of the oblique surfaces 35, and a particular rotor diameter. The tooth angle B defines the tangential force on the rotor 20 from the actuators 30, and for a given diameter that determines the torque generated. The shafts 32 engage different portions of the teeth 38 to ensure that the rotor 20 may be rotated in both directions by the actuators 30.

Figure 1B:
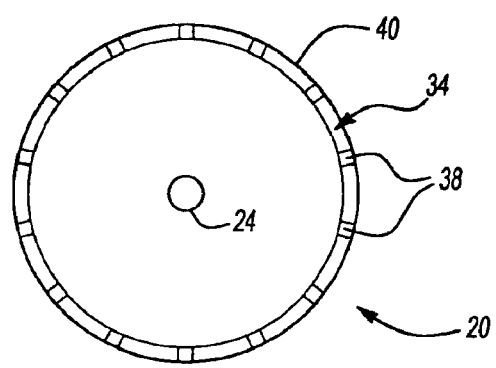
FIG. 1B is an end view of the rotor shown in FIG. 1A.
Figure 2A:
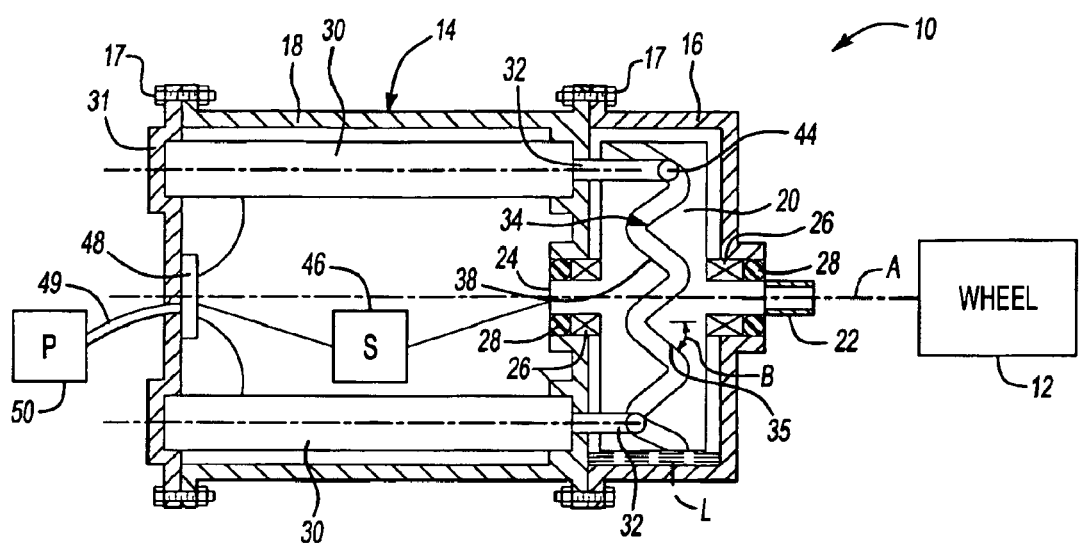
FIG. 2A is a cross-sectional view of the present invention with another rotor configuration.
Figure 2B:
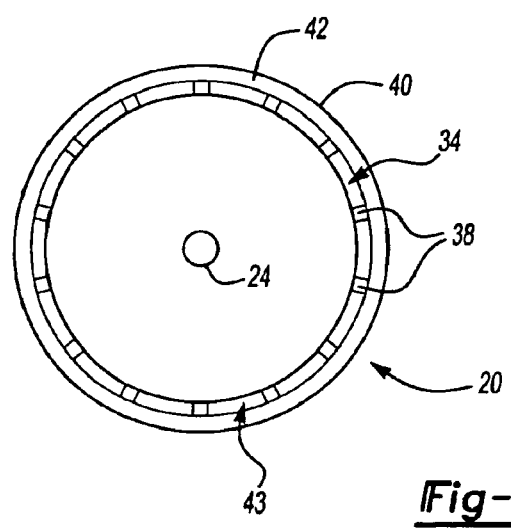
FIG. 2B is an end view of the rotor shown in FIG. 2A.

As shown in FIGS. 1A and 1B, the profile 34 extends to a perimeter 40 of the rotor 20 forming a type of spur gear. Alternatively, a groove 43 may be formed in the rotor 20 such that an outer circumferential portion 42 is located radially outwardly from the groove 43 to the perimeter 40, as shown in FIGS. 2A and 2B. The groove 43 defines the profile 34. The terminal end of the shaft 32 is arranged within the groove 43 so that the groove acts as a guide. The terminal end of the shaft 32 may be designed to reduce wear and friction between the shaft 32 and rotor 20. For example, the end may simply be rounded (FIG. 1A) or ball bearing may be arranged between the rotor 20 and shaft 32 (FIG. 2A).

A rotational sensor 46 may be employed to determine the rotational position of the rotor 20. A controller 48 is electrically connected to the sensor 46 and actuators. A power source 50 supplies power to the electrical components through leads 49.

In operation, a desired rotational direction is determined and sent to the controller 48. Based upon the rotational position of the rotor 20 provided by the sensor 46 and the desired rotational direction, the actuators 30 are selectively actuated in a particular sequence in response to series of commands from the controller 48. The controller 48 determines where the shafts 32 engage the teeth 38 using the sensed rotor position. The actuators 30 are moved from the retracted position to the extended position based upon which slope or oblique surface of a tooth 38 the shaft 32 engages and the desired direction of rotation. The actuators 30 are commanded to retract by the controller 48 when the shaft 32 engages a slope that would result in a rotational direction opposite to the desired rotational direction of the rotor 20.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A motor assembly comprising:

a housing;

a rotor disposed within said housing, said rotor rotatable about an axis, said rotor having profile generally concentric with said axis, and said profile including oblique surfaces; and at least one linear actuator having a shaft engaging said oblique surfaces, said shaft movable linearly alone a first direction between extended and retracted positions to rotate said rotor about said axis, said first direction having at least a component extending parallel to said axis.

2. The assembly according to claim 1, wherein said oblique surfaces define sinusoidal teeth.

3. The assembly according to claim 2, wherein said sinusoidal teeth extend circumferentially about said axis.

4. The assembly according to claim 3, wherein said sinusoidal teeth are formed at a radially outer perimeter of said rotor.

5. The assembly according to claim 3, wherein said rotor includes an annular groove spaced radially inwardly from a radially outer perimeter of said rotor, said radially outer perimeter defining said profile, and said rotor including a circumferential portion arranged adjacent to said annular groove and extending radially outwardly to said radially outer perimeter.

6. The assembly according to claim 1, wherein said at least one linear actuator includes a plurality of linear actuators arranged circumferentially about said axis.

7. The assembly according to claim 1, wherein said rotor is arranged in an enclosed housing portion with lubricant disposed therein, said shafts extending into said enclosed housing portion to engage said profile.

8. The assembly according to claim 1, wherein said shaft includes a rounded terminal end engaging said profile.

9. The assembly according to claim 8, wherein said rounded terminal end includes a ball reducing a friction force between said rounded terminal end and said profile.

10. The assembly according to claim 6, wherein said linear actuators are electric.

11. The assembly according to claim 10, wherein a controller is electrically connected to said linear actuators to command said linear actuators to move and effect a desired rotational direction of said rotor.

12. The assembly according to claim 11, wherein a sensor is electrically connected to said controller to determine a rotational position of said rotor, said controller commanding said linear actuators in response to said rotational position to effect said desired rotational direction.

13. The assembly according to claim 1, wherein a vehicle wheel is coupled to said rotor.

14. The assembly according to claim 1, wherein said first direction is parallel to said axis.

15. A drive assembly for a wheel comprising:

a housing;

a rotor disposed within said housing, said rotor rotatable about an axis, said rotor having a profile generally concentric with said axis, and said profile including oblique surfaces;

a wheel shaft driven by said rotor and coupled to drive a vehicle wheel; and at least one linear actuator having an actuator shaft engaging said oblique surfaces, said actuator shaft movable linearly between extended and retracted positions to rotate said rotor about said axis.

16. The assembly according to claim 15, wherein said oblique surfaces define sinusoidal teeth.

17. The assembly according to claim 16, wherein said sinusoidal teeth extend circumferentially about said axis.

18. The assembly according to claim 15, wherein said at least one linear actuator includes a plurality of linear actuators arranged circumferentially about said axis generally parallel to said axis.

19. The assembly according to claim 18, wherein a controller is electrically connected to said linear actuators to command said linear actuators to effect a desired rotational direction of the vehicle wheel.

20. The assembly according to claim 19, wherein a sensor is electrically connected to said controller to determine a rotational position of said rotor, said controller commanding said linear actuators in response to said rotational position to effect said desired rotational direction.

* * * * *

UNITED STATES PATENT AND TRADEMARK OFFICE
CERTIFICATE OF CORRECTION

PATENT NO.     : 6,794,772 B1                                                                Page 1 of 1
DATED          : September 21, 2004
INVENTOR(S)    : Bell et al.

It is certified that error appears in the above-identified patent and that said Letters Patent is hereby corrected as shown below:

Column 3,
Line 23, "alone" should read as -- along --.

Signed and Sealed this

Fourteenth Day of December, 2004

JON W. DUDAS
*Director of the United States Patent and Trademark Office*